(12) United States Patent
Ashworth et al.

(10) Patent No.: US 9,208,418 B2
(45) Date of Patent: Dec. 8, 2015

(54) METHOD AND SYSTEM FOR FORMING A HALFTONE SCREEN

(71) Applicant: Megadot Systems Limited, Petone, Lower Hutt (NZ)

(72) Inventors: William Frederick Ashworth, Lower Hutt (NZ); Andrew McKenzie Fraser, Auckland (NZ)

(73) Assignee: Megadot Systems Limited, Petone, Lower Hutt (NZ)

( * ) Notice: Subject to any disclaimer, the term of this patent is extended or adjusted under 35 U.S.C. 154(b) by 0 days.

(21) Appl. No.: 14/362,035

(22) PCT Filed: Dec. 3, 2012

(86) PCT No.: PCT/NZ2012/000225
§ 371 (c)(1),
(2) Date: May 30, 2014

(87) PCT Pub. No.: WO2013/081480
PCT Pub. Date: Jun. 6, 2013

(65) Prior Publication Data
US 2014/0340716 A1   Nov. 20, 2014

Related U.S. Application Data

(60) Provisional application No. 61/566,284, filed on Dec. 2, 2011.

(51) Int. Cl.
*G06K 15/00* (2006.01)
*G06K 15/02* (2006.01)
*H04N 1/405* (2006.01)

(52) U.S. Cl.
CPC .......... *G06K 15/1881* (2013.01); *H04N 1/4055* (2013.01)

(58) Field of Classification Search
None
See application file for complete search history.

(56) References Cited

U.S. PATENT DOCUMENTS 5,583,660 A * 12/1996 Rylander ..................... 358/3.17
5,808,755 A *  9/1998 Delabastita .................. 358/3.17

(Continued)

FOREIGN PATENT DOCUMENTS

EP      0527655 B1   11/2000

OTHER PUBLICATIONS

International Application No. PCT/NZ2012/000225, International Search Report and Written Opinion mailed Feb. 21, 2013.

*Primary Examiner* — Dung Tran
(74) *Attorney, Agent, or Firm* — Sheppard, Mullin, Richter & Hampton LLP

(57) ABSTRACT

A method of forming a halftone screen comprising representing each of a first, second, third and fourth tone range of increasing darkness by forming a plurality of dots arranged in a grid; the dots representing the second tone range larger than the dots representing the first tone range; the dots representing the third tone range having a body section and at least one extension extending toward a or respective nearest neighbor(s), the extension(s) narrower in width than the body section, the dots representing the third tone range substantially the same size as the dots representing the second tone range; and the dots representing the fourth tone range having a body section and at least one extension extending toward a or respective nearest neighbor(s), the extension(s) greater in width than the extension(s) associated with the dots representing the third tone range. A halftone screen and a printing system are also disclosed.

48 Claims, 8 Drawing Sheets

(56) References Cited

U.S. PATENT DOCUMENTS

| | | | |
|---|---|---|---|
| 6,072,592 A * | 6/2000 | Ashworth | 358/1.9 |
| 6,198,545 B1 * | 3/2001 | Ostromoukhov et al. | 358/3.09 |
| 6,813,044 B2 * | 11/2004 | Rylander | 358/3.13 |
| 6,970,273 B1 * | 11/2005 | Inoue | 358/3.02 |
| 7,268,920 B1 * | 9/2007 | Ashworth | 358/3.2 |
| 7,310,168 B2 * | 12/2007 | Trelewicz et al. | 358/3.11 |
| 8,132,508 B2 * | 3/2012 | Samworth et al. | 101/463.1 |
| 8,456,699 B2 * | 6/2013 | Ulichney et al. | 358/1.9 |
| 8,482,803 B2 * | 7/2013 | Wang et al. | 358/3.2 |
| 8,547,598 B2 * | 10/2013 | Wang et al. | 358/3.2 |
| 8,610,956 B2 * | 12/2013 | Takebe et al. | 358/3.06 |
| 8,681,383 B2 * | 3/2014 | Wang et al. | 358/3.06 |
| 8,755,088 B2 * | 6/2014 | Russell | 358/3.09 |
| 2011/0157654 A1 * | 6/2011 | Wang et al. | 358/3.2 |

* cited by examiner

METHOD AND SYSTEM FOR FORMING A HALFTONE SCREEN

CROSS-REFERENCE TO RELATED APPLICATIONS

This application is a national stage application pursuant to 35 U.S.C. §371 of International Application No. PCT/NZ2012/000225, filed Dec. 3, 2012, which claims priority to U.S. Provisional Patent Application Ser. No. 61/566,284, filed Dec. 2, 2011, the disclosures of which are hereby incorporated by reference herein.

FIELD OF INVENTION

The invention relates to methods and systems for forming a halftone screen.

BACKGROUND TO THE INVENTION

Colour images are typically printed using three or more colours and black. These colours are known as process colours. Common process colours comprise cyan, magenta and yellow. Black is also used to improve the printing of dark areas. A large range or gamut of colours can be reproduced by printing the process colours in different combinations, together with black. Some printing techniques use other colours either in addition or in substitution for cyan, magenta yellow and black.

A given colour is reproduced by adjusting the amount of each of the process colours and black. This is achieved by adjusting the ratio of ink to white paper for each process colour and black. Generally the ratio of ink to white paper is controlled by printing each process colour in a series of dots that vary in either size or frequency. The pattern of dots for each process colour is called a halftone pattern, a halftone screen or a screen.

The combination of the individual halftone screens for each process colour and black results in the appearance of the full colour image.

In traditional amplitude modulated screening, the ratio of ink to white paper is controlled by varying the size of individual dots. The dots are arranged on a grid that is defined by the number of lines per inch. This is known as the screen ruling or screen frequency. The grid can be either orthogonal or non-orthogonal.

The grids for each process colour and black will generally be on different angles known as screen angles. In irrational screening, which is a commonly used technique, three orthogonal grids of the same screen ruling are rotated to intervals of 30° relative to each other. The three grids typically represent cyan, magenta and black respectively. A fourth screen for the yellow colour may be of a slightly different screen ruling or frequency which is generally arranged at 15° to two of the other screens. This arrangement results in a pattern that incorporates a series of circular features known as rosettes.

An individual grid comprises an array of cells known as dot cells. Each dot cell generally contains a maximum of one dot. In the case of an orthogonal grid, the dot cells are square.

There are a variety of dot shapes that are used to create halftone screens. Each dot shape is made up of n individual shapes that begin with a white dot cell representing 0% tone. The dot shape is formed and increases in size as the tone darkens (the level of density increases). Eventually a dot cell is formed that is completely filled with ink representing the 100% tone, i.e., the dot shape covers 100% of the area of the dot cell. As the area covered by the dot increases, the density of ink is said to increase or, alternatively, the tone is said to become darker. Often n will be 255 since this number of individual dot shapes, also representing the number of density levels, is an industry norm.

Three traditionally used dot shapes are round dots, elliptical dots and square dots. More commonly, the square dot is positioned so that its sides are oriented at 45 degrees to the edges of the dot cell containing the dot. Square dots on this orientation make up a chequerboard pattern near the mid-tone point (50% density) when all four corners touch. This orientation can be referred to as the 45 degree orientation.

An alternative use of the square dot is where the dot is positioned so that its sides are orientated parallel to the respective adjacent edges of the dot cell containing the dot. Square dots on this orientation result in a grid of non-image white lines in the mid to three-quarter tones. This orientation can be referred to as the parallel orientation.

The square dot on the parallel orientation has the potential to produce a sharper high contrast look especially in the mid tones. A disadvantage of the square dot on the parallel orientation is that, as the dot approaches higher density levels, the non printed area becomes very thin. It is difficult to accurately print individual dots with such fine non printed areas between them. The result is that ink can bridge the narrow gap producing a jump in tone, thereby reducing the effective number of density levels available. This in turn limits the gamut of colours that can reliably be reproduced. This means that the square dot on the parallel orientation is effectively rendered impractical for many printing processes.

It is an object of preferred embodiments of the present invention to address some of the aforementioned disadvantages of the square dot on the parallel orientation. An additional and/or alternative object is to at least provide the public with a useful choice.

SUMMARY OF INVENTION

The invention in one embodiment comprises a method of forming a halftone screen the method comprising representing a first tone range by forming a plurality of dots arranged in a grid;

representing a second tone range by forming a plurality of dots arranged in a grid, the dots representing the second tone range larger in size than the dots representing the first tone range, the second tone range darker than the first tone range;

representing a third tone range by forming a plurality of dots arranged in a grid, the dots having a body section and at least one extension extending toward a or respective nearest neighbour(s), the extension(s) narrower in width than the body section of the dots, the body sections of the dots representing the third tone range substantially the same size as the larger dots within the second tone range, the third tone range darker than the second tone range; and representing a fourth tone range by forming a plurality of dots arranged in a grid, the dots having a body section and at least one extension extending toward a or respective nearest neighbour(s), the extension(s) greater in width than the extension(s) associated with the dots representing the third tone range, the fourth tone range darker than the third tone range.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in similar manner.

Preferably the dots representing the first tone range are substantially square on the parallel orientation. Preferably the substantially square dots representing the first tone range have at least partly concave sides.

Preferably the dots representing the first tone range are substantially circular.

Preferably the dots representing the first tone range are substantially cross-shaped.

Preferably the dots representing the second tone range are substantially square on the parallel orientation. Preferably the substantially square dots representing the second tone range have at least partly concave sides.

Preferably the body sections of the dots representing the third tone range are substantially square on the parallel orientation. Preferably the substantially square body sections of the dots representing the third tone range have at least partly concave sides.

Preferably at least one extension extending from the substantially square body sections of the dots representing the third tone range extend(s) from a or respective midpoint(s) of respective lines connecting two adjacent corners of the substantially square body sections.

Preferably the at least one extension extending from the body sections of the dots representing the third tone range extend(s) from an edge of the dot at a point that is in line with the centre of the dot and the centre of a or respective nearest neighbour(s).

Preferably the width of the extensions extending from the body sections of the dots representing the third tone range at any point is inversely proportional to the distance of the point from the body sections.

Preferably the width of the extensions extending from the body sections of the dots representing the third tone range is substantially uniform along the length of the extension.

Preferably the width of extensions extending from the body sections of the dot representing the third tone range is non-uniform along the length of the extension.

Preferably the method further comprises representing an intermediate tone range by forming a plurality of dots arranged in a grid, the intermediate tone range darker than the second tone range, the third tone range darker than the intermediate tone range, the dots having a body section and one or more portions positioned outwardly of and separate from the body section.

Preferably the method further comprises forming a cross-shaped non-printed area between at least some of the dots representing the third tone range.

Preferably the method further comprises forming cross-shaped non-printed areas between at least some of the dots representing the fourth tone range, the cross-shaped non-printed areas between the dots within the fourth tone range smaller in area than the cross-shaped non-printed areas between the dots within the third tone range.

Preferably the body sections of the dots representing the fourth tone range are substantially square on the parallel orientation. Preferably the substantially square dots representing the fourth tone range have at least partly concave sides.

Preferably at least one extension from the substantially square body sections of the dots representing the fourth tone range extend(s) from a or respective midpoint(s) of respective lines connecting two adjacent corners of the substantially square body sections.

Preferably the at least one extension extending from the body sections of the dots representing the fourth tone range extend(s) from an edge of the dot at a point that is in line with the centre of the dot and the centre of a or respective nearest neighbour(s).

Preferably the dots representing the third tone range are connected to at least one nearest neighbour with the respective extensions.

Preferably the dots representing the fourth tone range are connected to at least one nearest neighbour with the respective extensions.

Preferably the method further comprises representing a fifth tone range by forming a plurality of non-printed areas smaller in area than non-printed areas in the first to fourth tone ranges.

In another embodiment the invention comprises a tangible computer readable medium having stored thereon computer-executable instructions for performing a method of forming a halftone screen, the method comprising representing a first tone range by forming a plurality of dots arranged in a grid; representing a second tone range by forming a plurality of dots arranged in a grid, the dots representing the second tone range larger in size than the dots representing the first tone range, the second tone range darker than the first tone range; representing a third tone range by forming a plurality of dots arranged in a grid, the dots having a body section and at least one extension extending toward a or respective nearest neighbour(s), the extension(s) narrower in width than the body section of the dots, the body sections of the dots representing the third tone range substantially the same size as the larger dots within the second tone range, the third tone range darker than the second tone range; and representing a fourth tone range by forming a plurality of dots arranged in a grid, the dots having a body section and at least one extension extending toward a or respective nearest neighbour(s), the extension(s) greater in width than the extension(s) associated with the dots representing the third tone range, the fourth tone range darker than the third tone range.

Preferably the dots representing the first tone range are substantially square on the parallel orientation. Preferably the substantially square dots representing the first tone range have at least partly concave sides.

Preferably the dots representing the first tone range are substantially circular.

Preferably the dots representing the first tone range are substantially cross-shaped.

Preferably the dots representing the second tone range are substantially square on the parallel orientation. Preferably the substantially square dots representing the second tone range have at least partly concave sides.

Preferably the body sections of the dots representing the third tone range are substantially square on the parallel orientation. Preferably the substantially square body sections of the dots representing the third tone range have at least partly concave sides.

Preferably at least one extension extending from the substantially square body sections of the dots representing the third tone range extend(s) from a or respective midpoint(s) of respective lines connecting two adjacent corners of the substantially square body sections.

Preferably the at least one extension extending from the body sections of the dots representing the third tone range extend(s) from an edge of the dot at a point that is in line with the centre of the dot and the centre of a or respective nearest neighbour(s).

Preferably the width of the extensions extending from the body sections of the dots representing the third tone range at any point is inversely proportional to the distance of the point from the body sections.

Preferably the width of the extensions extending from the body sections of the dots representing the third tone range is substantially uniform along the length of the extension.

Preferably the width of extensions extending from the body sections of the dot representing the third tone range is non-uniform along the length of the extension.

Preferably the method further comprises representing an intermediate tone range by forming a plurality of dots arranged in a grid, the intermediate tone range darker than the second tone range, the third tone range darker than the intermediate tone range, the dots having a body section and one or more portions positioned outwardly of and separate from the body section.

Preferably the method further comprises forming a cross-shaped non-printed area between at least some of the dots representing the third tone range.

Preferably the method further comprises forming cross-shaped non-printed areas between at least some of the dots representing the fourth tone range, the cross-shaped non-printed areas between the dots within the fourth tone range smaller in area than the cross-shaped non-printed areas between the dots within the third tone range.

Preferably the body sections of the dots representing the fourth tone range are substantially square on the parallel orientation. Preferably the substantially square dots representing the fourth tone range have at least partly concave sides.

Preferably at least one extension from the substantially square body sections of the dots representing the fourth tone range extend(s) from a or respective midpoint(s) of respective lines connecting two adjacent corners of the substantially square body sections.

Preferably the at least one extension extending from the body sections of the dots representing the fourth tone range extend(s) from an edge of the dot at a point that is in line with the centre of the dot and the centre of a or respective nearest neighbour(s).

Preferably the dots representing the third tone range are connected to each nearest neighbour with the respective extensions.

Preferably the dots representing the fourth tone range are connected to each nearest neighbour with the respective extensions.

Preferably the method further comprises representing a fifth tone range by forming a plurality of non-printed areas smaller in area than non-printed areas in the first to fourth tone ranges.

In a further embodiment the invention comprises a halftone screen comprising a first tone range comprising a plurality of dots arranged in a grid; a second tone range comprising a plurality of dots arranged in a grid, the dots representing the second tone range larger in size than the dots representing the first tone range, the second tone range darker than the first tone range; a third tone range comprising a plurality of dots arranged in a grid, the dots having a body section and at least one extension extending toward a or respective nearest neighbour(s), the extension(s) narrower in width than the body section of the dots, the body sections of the dots representing the third tone range substantially the same size as the larger dots within the second tone range, the third tone range darker than the second tone range; and a fourth tone range comprising a plurality of dots arranged in a grid, the dots having a body section and at least one extension extending toward a or respective nearest neighbour(s), the extension(s) greater in width than the extension(s) associated with the dots representing the third tone range, the fourth tone range darker than the third tone range.

In another embodiment the invention comprises a printing system comprising a memory; a processor programmed to form at least one halftone screen and store the halftone screen in the memory, the processor further programmed to: represent a first tone range by forming a plurality of dots arranged in a grid; represent a second tone range by forming a plurality of dots arranged in a grid, the dots representing the second tone range larger in size than the dots representing the first tone range, the second tone range darker than the first tone range; represent a third tone range by forming a plurality of dots arranged in a grid, the dots having a body section and at least one extension extending toward a or respective nearest neighbour(s), the extension(s) narrower in width than the body section of the dots, the body sections of the dots representing the third tone range substantially the same size as the larger dots within the second tone range, the third tone range darker than the second tone range; and represent a fourth tone range by forming a plurality of dots arranged in a grid, the dots having a body section and at least one extension extending toward a or respective nearest neighbour(s), the extension(s) greater in width than the extension(s) associated with the dots representing the third tone range, the fourth tone range darker than the third tone range.

BRIEF DESCRIPTION OF FIGURES

Preferred forms of a method and system for forming a halftone screen will now be described with reference to the accompanying figures in which.

DETAILED DESCRIPTION

Figure 1:
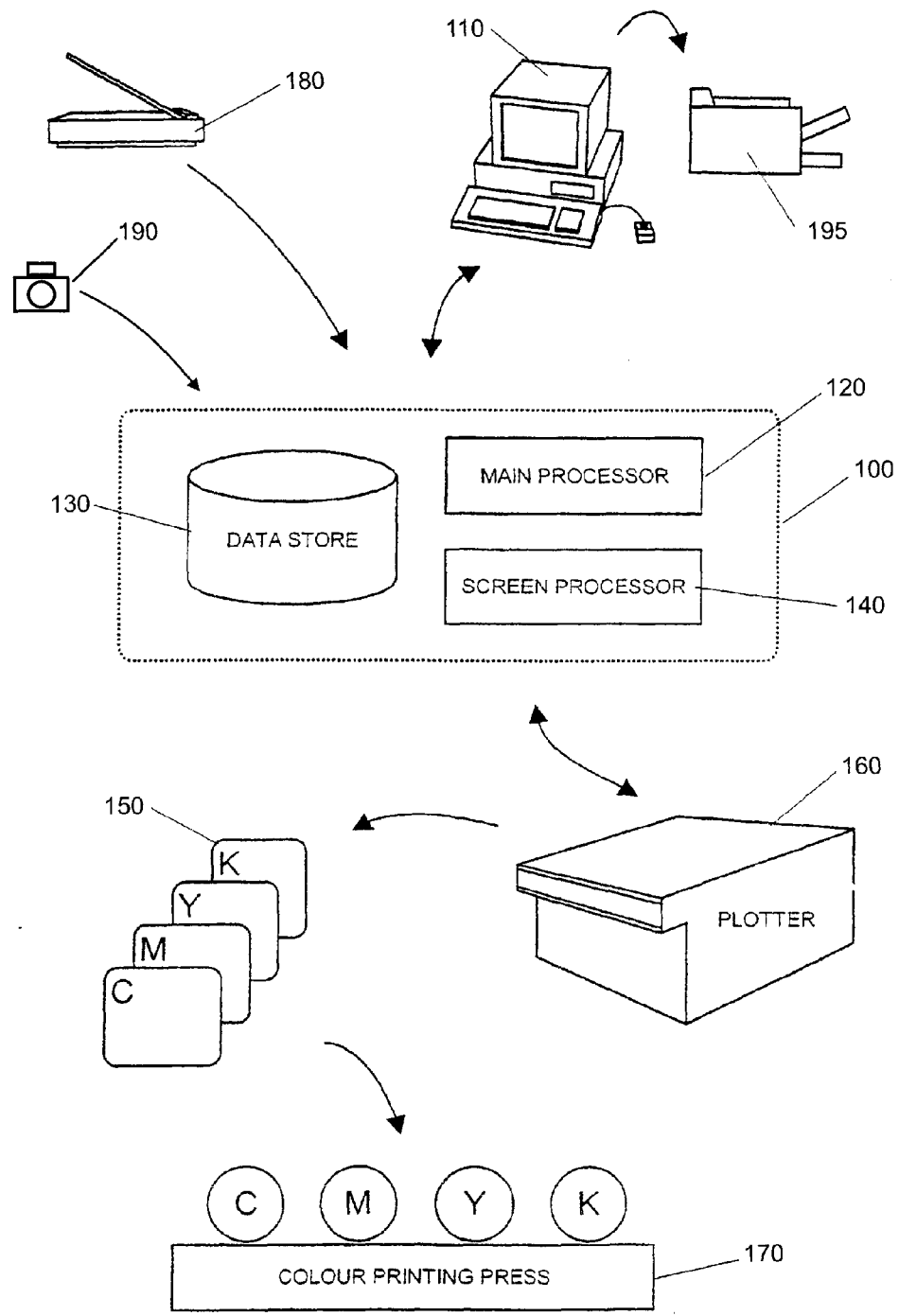
FIG. 1 shows conventional equipment used in preparing halftone screens.

Referring to the drawings it will be appreciated that the various novel patterns and techniques must here be printed in black and white and magnified significantly for the purposes of a clear description. It will also be appreciated that the patterns and various shapes of the printed and non-printed areas may be implemented by an appropriate mathematical construction of a spot function or a threshold matrix using a wide range of hardware and software that is already available.

A schematic indication of hardware and software systems that are suitable for implementing the invention will be given. Details are left to the skilled reader.

FIG. 1 shows a schematic collection of computer-based or otherwise computer controlled equipment that might be used in production of halftone screens and in producing a result in printed form. A wide range of equipment and software is currently in use or under development and these items are shown by way of example only and for the purposes of explanation.

Part of the processing that relates most closely to the invention usually takes place in a computer processor arrangement 100. This may be a separate item of equipment as shown, or may be part of a more general item such as a processing device shown as a desktop computer 110.

Computer processing arrangement 100 includes further components such as a main processor 120 and data storage capacity 130. The device may optionally include a dedicated processor 140 for high speed processing of image data.

Halftone patterns or screens 150 produced by the processor are indicated as physical forms in the CMYK system. This physical form might be film from an imagesetter or laser plotter 160 for example, or printing plates for a press 170.

Alternatively the halftone screens may be represented by computer data in a portable memory storage component such as solid state, optical or magnetic storage media. The halftone screens may exist as data files in various formats which can then be saved or output to other devices such as platesetters, or digital printers.

An original image may be input to the equipment in various ways such as from a photograph or other tangible artwork scanned by a digital scanner 180 or an image captured in digital form by a digital camera 190. Alternatively the original image is created initially on a computer system such as desktop computer 110 interfaced to printer 195.

Figure 2:
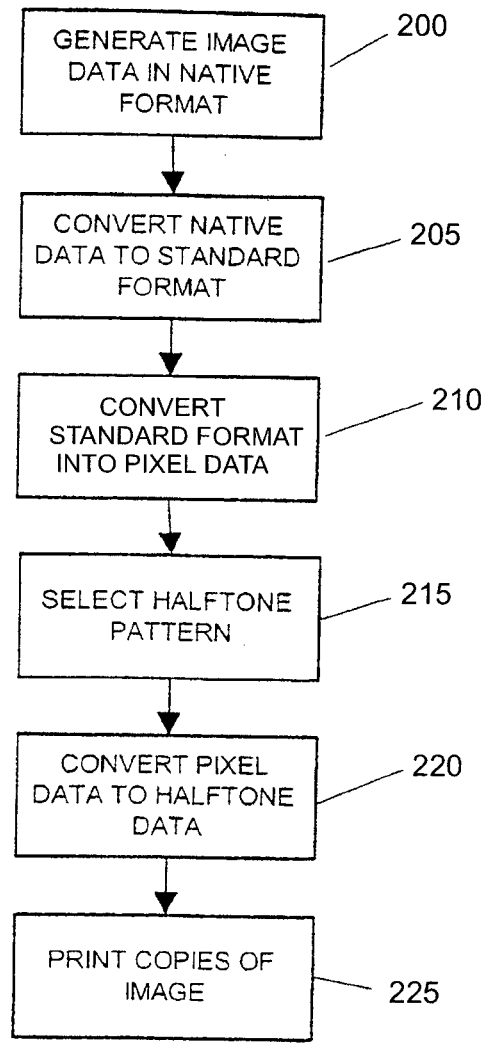
FIG. 2 shows a method for preparing a halftone screen.

FIG. 2 outlines a process for generating and printing halftone screens. An original digital image is created in step 200 on a computer device. The image data may be created using a graphics program and stored in a format which is native to the device such as a particular vector or bitmap format.

Parts of the image may also be imported from other sources such as clipart, a digital camera, or scanned photographs when composing a desktop publication for example. In step 205, the native data is converted into a standard format such as POSTSCRIPT or PDF which can be interpreted by an output device such as a local laser printer with a particular resolution.

The standard format is converted into pixel data in step 210 where the image is represented by an array of digital values. This process is known as rasteriztation and usually occurs inside a raster image processing program or RIP.

A wide variety of patterns and processes are then available for conversion of the pixel data to halftone screen data. Details appropriate to a particular image are selected automatically or by an operator in step 215. The conversion processes take place in step 220 by way of a computer system 100 such as that indicated in FIG. 1.

The patterns are generally created from the pixel information by a RIP or other software. The program calculates the locations, spacings, sizes and shapes of the dots for each colour separation.

An operator normally has a range of standard patterns installed on the equipment and may be able to develop variations of those patterns in some cases. Traditional calculations involve screen frequencies and angles although more sophisticated equipment enables patterns to be created without reference to these parameters. The operator is able to proof and modify the selection of patterns to minimise various effects such as moire, colour shift and tone jump according to the subsequent reproduction technique.

The RIP or other software then stores the halftone screen data in a format such as black and white bitmap file in computer memory.

Copies of the original image may then be printed in step 225 or sent to a platesetter, stored in an electronic format such as a TIFF file, or transferred elsewhere from the stored data as required, depending on the manner in which the image will be published and the equipment which is available.

Figure 3:
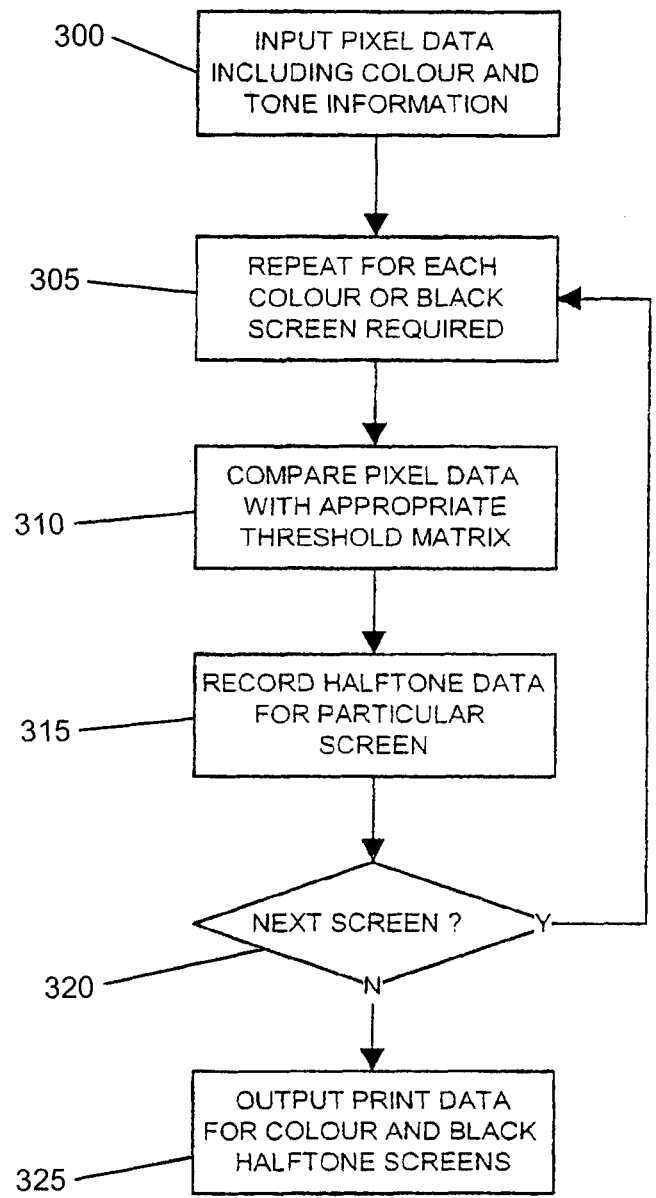
FIG. 3 shows a conversion process from the methods shown in FIG. 2.

FIG. 3 outlines the conversion process of step 220 from FIG. 2. The step is generally carried out by known RIP or other software. The process first receives pixel data including colour and tone information in step 300. Each pixel includes data which enables determination of a tone value for each of the colours in a chosen colour system. This colour system is usually CMYK. The tone value is determined for a small area located at the point represented by the pixel in the coloured image.

The generation of a halftone screen for each of the colours produces a large amount of data that may be stored in a common computer file or in separate files. This data usually takes the form of binary on/off instructions in relation to the output grid of a printing device.

In steps 305, 310, 315 and 320 the pixel data is parsed for each of the required colours to determine halftone screen information for that colour. Mathematical constructs called spot functions or threshold matrices are used in step 310 to determine the halftone patterns that have been selected for the colours.

Each pixel is compared with a threshold matrix for the particular colour. Binary data relating to the output grid of the particular printing device is determined and stored in an appropriate computer file in step 315. Eventually the colour separation is complete and the halftone screen data can be stored or output to a device such as a platesetter or a printer in step 325 when required.

The techniques described below provide a sequence of dot shapes that seek to retain and improve upon the advantages of the square shaped dot on a parallel orientation in the mid tone. As described above, the advantage of the square shaped dot on the parallel orientation is the potential to produce a sharper higher contrast look in the mid tones. The techniques described below seek to at least address the traditional disadvantage of such square dot shapes of the non printed area being thin and difficult to accurately print at high tone levels.

The square shaped dot on the parallel orientation improves the mid tone by partially suppressing the appearance of the rosette. This occurs because the square shaped dot on the parallel orientation puts ink into the centre of the rosette. Other commonly used dot shapes such as round or elliptical dots tend to leave white space at the centre of the rosette. The contrast between the white space at the centre and the ink around the edge makes rosettes more noticeable in print.

The techniques described below seek to retain the penetration of ink into the corners of the dot cell for as much of the range of the dot shape as possible, while allowing for a non printed area that suits the limitations of the printing process.

Figure 4:
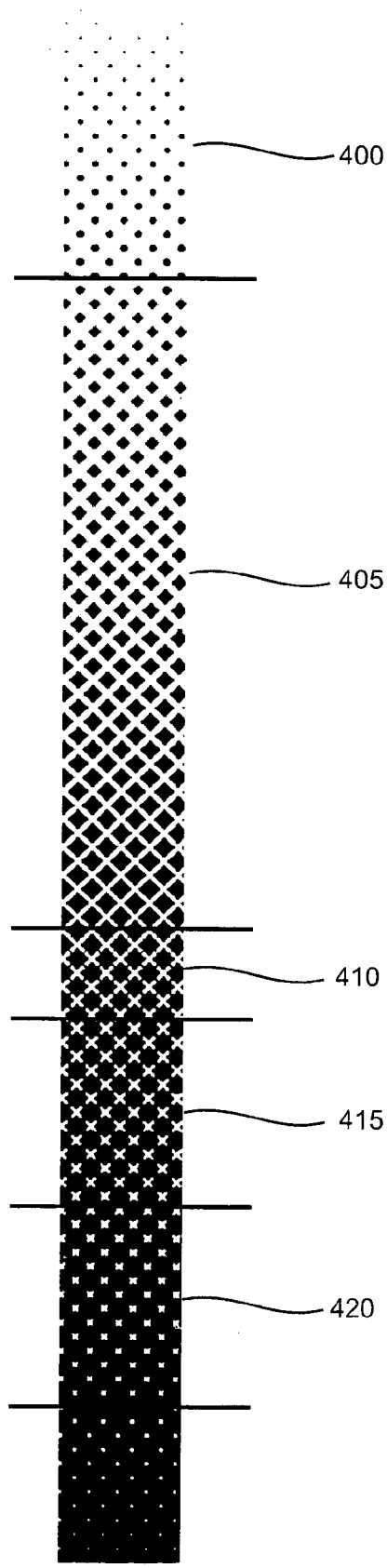
FIG. 4 shows a gradation illustrating the range of dot shapes of the invention.

FIG. 4 shows a gradation that shows a series of ranges of dot shapes representing darkening tone from top to bottom. The halftone screen is typically formed by representing a first tone range 400 by forming a plurality of dots arranged in a grid. It is anticipated that the grid is either orthogonal or non-orthogonal. In one embodiment the grid is substantially regular. In a further embodiment the grid is at least partly distorted.

Subsequent tone ranges are also shown in the gradation for example a second tone range 405, a third tone range 410 and a fourth tone range 415. There is an optional fifth tone range 420. These five tone ranges are described further below with reference to FIG. 4 and subsequent figures.

It is anticipated that the dots in the first tone range 400 comprise various shapes. In one embodiment most of the dots are substantially square. In another embodiment most of the dots are substantially round or circular.

The dot shapes shown in FIG. 4 and subsequent figures relate to a single colour. In practice there may be four different screens, one for each of cyan, magenta, black and yellow and each on a different screen angle. It is anticipated that the dot shapes shown below are used for at least one of these colours. In FIG. 4 the dots are shown on an orthogonal grid at a screen angle of 45 degrees.

Figure 5:
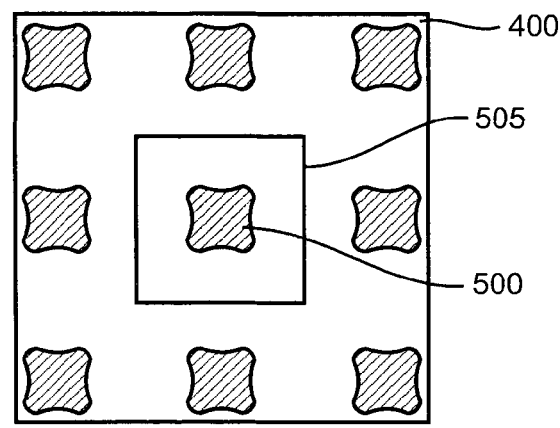
FIG. 5 shows preferred form dot shapes in a first tone range from FIG. 4.

FIG. 5 shows preferred form dots shown in the first tone range 400. One example dot is shown at 500 within a dot cell 505. The dot cell 505 represents the maximum size that a dot 500 can assume. It is anticipated that there is generally one dot 500 per dot cell 505.

Dot 500 and neighbouring dots are shown as substantially square with at least one and preferably all four sides at least partly concave.

Figure 6:
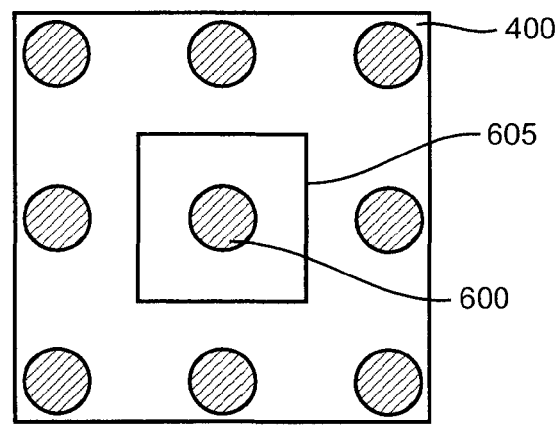
FIG. 6 shows an alternative preferred form dot shape in a first tone range from FIG. 4.

FIG. 6 shows an alternative preferred form dot 600 represented within a dot cell 605. Dot 600 forms part of first tone range 400. As shown in FIG. 6 the dot 600 and neighbouring dots are substantially circular.

It will be appreciated that other dot shapes are possible within the first tone range 400. One example is where some or all of the dots are substantially cross-shaped. It is anticipated that the four arms of the cross are substantially the same length.

Referring to FIG. 4, the method further includes representing a second tone range 405 by forming a plurality of dots arranged in a grid. The dots representing the second tone range are typically larger in size than the dots representing the first tone range 400. As is apparent from FIG. 4, the second tone range 405 is darker than the first tone range 400.

Figure 7:
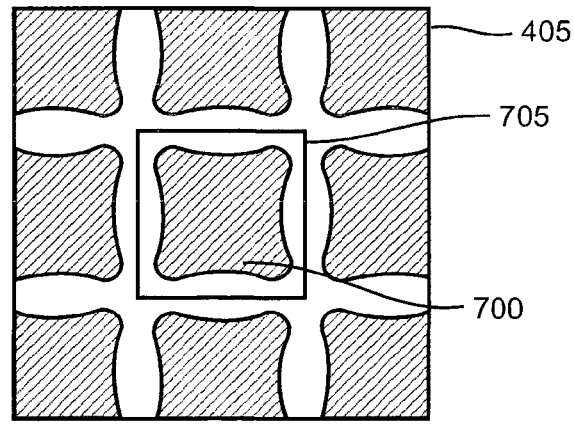
FIG. 7 shows a preferred form dot forming part of a second tone range from FIG. 4.

FIG. 7 shows a magnified view of a dot 700 within a dot cell 705. Dot 700 is representative of a dot forming part of the second tone range 405. As is apparent in FIG. 7, the dot 700 is larger in size than dot 500 or dot 600 and takes up more of the dot cell 705. The preferred form shape of the dot 700 is substantially square. As shown, it is preferred that one or preferably all of the sides of dot 700 are at least partly concave.

Referring to FIG. 4, the halftone screen includes a third tone range 410 which is represented by forming a plurality of dots arranged in a grid. The dots have a body section and at least one extension extending toward a/or respective nearest neighbour(s).

Figure 8:
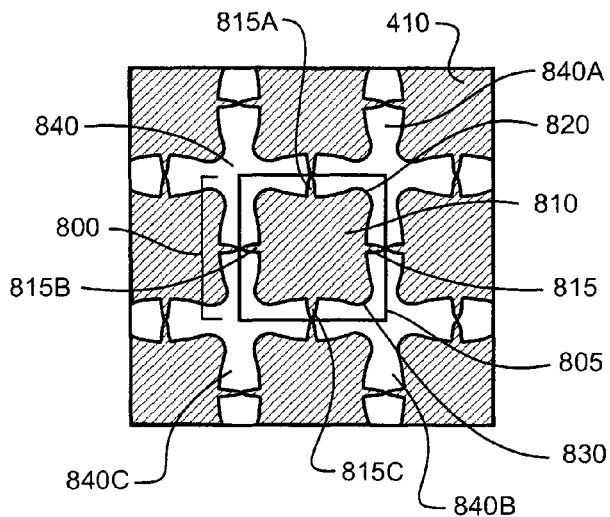
FIG. 8 shows a preferred form dot forming part of a third tone range from FIG. 4.

FIG. 8 shows a more detailed view of a dot represented within the third tone range 410. As shown in FIG. 8, the dot 800 is presented within the dot cell 805. Dot 800 has a body section 810. Dot 800 includes an extension 815 that extends toward its nearest neighbour. As shown in FIG. 8 there are preferably four extensions shown at 815, 815A, 815B and 815C. Where there is more than one extension 815, each extension 815 extends toward its nearest neighbour.

As shown in FIG. 8, each extension 815 extends to the edge of the dot cell 805 so that it touches corresponding extensions extending toward dot 800 from nearest neighbours. However, in practice, some dots in the third tone range will have shorter extensions that do not reach the edge of the dot cell. The extensions grow to reach the edge of the dot cell towards the end of the tone range.

Preferably the extensions 815 are narrower in width than the body section 810 of the dot 800. As will be apparent from the figures, the body section 810 of dot 800 is substantially the same size as the larger of the dots 700 within the second tone range. As shown in FIG. 4, the third tone range 410 is darker than the second tone range 405.

The body section 810 of dot 800 is preferably a substantially square shape. As shown in FIG. 8, the body section 810 preferably includes at least one and preferably four concave sides.

Extension 815 for example preferably extends from body section 810 from the midpoint of a line connecting corner 820 and corner 830 of the body section 810. As shown in FIG. 8, preferably each of the extensions 815 extend from the midpoint of the side of the body 810 from which they extend.

The extensions 815 are preferably tapered. The width of the extensions 815 at any point is inversely proportional to the distance of the point from the body section 810.

As also shown in FIG. 8, there is a cross-shaped non printed area 840 between dot 800 and three of its neighbours. Preferably there are four cross-shaped non printed areas 840, 840A, 840B and 840C between dot 800 and its neighbours.

Figure 8A:
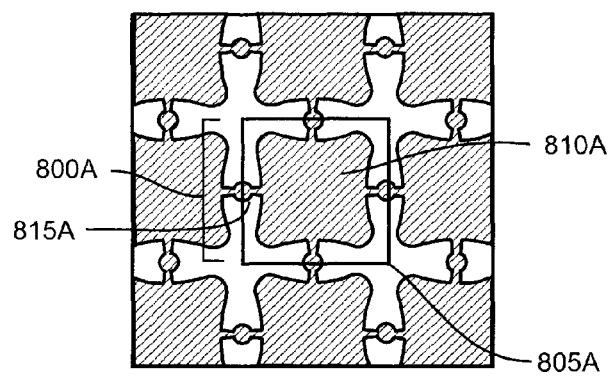
FIG. 8A shows another preferred form dot forming part of the third tone range from FIG. 4.

FIG. 8A shows a detailed view of an alternative example of a dot represented within the third tone range 410. As shown in FIG. 8A the dot 800A is presented within dot cell 805A. Dot 800A has a body section 810A. Dot 800A includes at least one and preferably four extensions in a similar way to that shown in FIG. 8. At least one extension 815A extends toward its nearest neighbour.

As can be seen in FIG. 8A, the width of one or more of the extensions 815A extending from the body section 810A is/are non-uniform along the length of the extension(s).

As shown in FIG. 8A, the extensions 815A extend to the edge of the dot cell 805A so that the extensions 815A touch respective corresponding extensions extending toward dot 800A from nearest neighbours.

It is anticipated that at least some dots of lighter tone than dot 800A are associated with at least one portion that is/are not connected to dot 800A. Alternatively or additionally at least some dots of lighter tone than dot 800A include at least one extension that does not touch respective corresponding extensions extending toward dot 800A from nearest neighbours.

Preferably the extensions 815A are narrower in width than the body section 810A of the dot 800A. As will be apparent from the figures, the body section 810A of dot 800A is substantially the same size as the larger of the dots 700 within the second tone range.

The body section 810A of dot 800A is preferably a substantially square shape. As shown in FIG. 8A, the body section 810A preferably includes at least one and preferably four concave sides. Extension(s) 815A preferably extend from the body section 810A from the midpoint of a side of the body 810A from which they extend.

The extensions 815A are preferably tapered. The width of the extensions 815A at any point is proportional to the distance of the point from the body section 810A. The width of the extensions 815A is greater towards the extremities of the extensions.

Figure 8B:
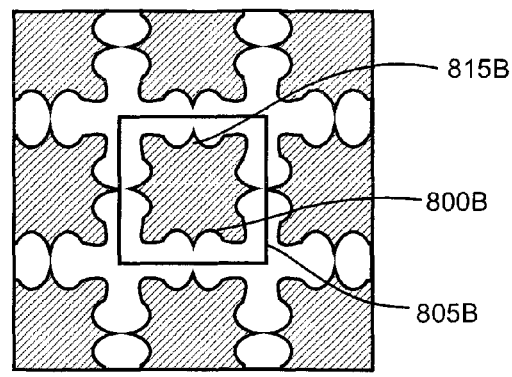
FIG. 8B shows another preferred form dot forming part of the third tone range from FIG. 4.

FIG. 8B shows a detailed view of a further alternative example of a dot represented within the third tone range 410. As shown in FIG. 8B the dot 800B is presented within dot cell 805B. Dot 800B has a body section.

The dot 800B includes at least one and preferably four extensions in a similar way to that shown in FIG. 8. At least one extension extends toward its nearest neighbour.

As can be seen in FIG. 8B, the width of one or more of the extensions 815B extending from the body section of dot 800B is/are non-uniform along the length of the extension(s). The extension(s) 815 are preferably tapered. The width of the extension(s) at any point is proportional to the distance of the point from the body section 800B. The width of the extension(s) is/are narrower towards the extremities of the extensions.

Figure 9:
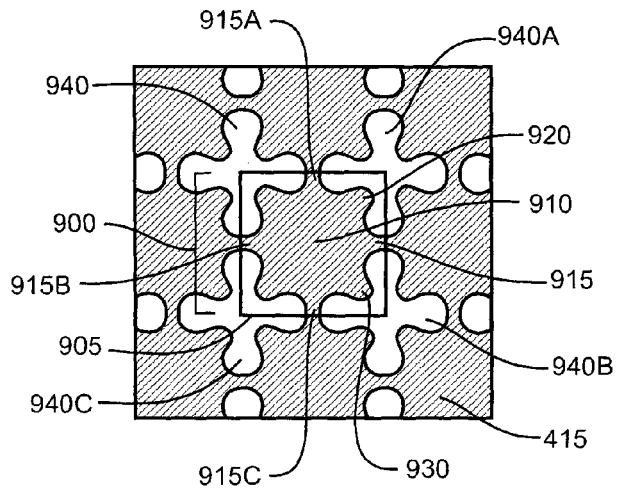
FIG. 9 shows a preferred form dot forming part of a fourth tone range from FIG. 4.

As shown in FIG. 4, there is a fourth tone range 415. The fourth tone range 415 is represented by forming a plurality of dots arranged in a grid. As shown in FIG. 9 a dot 900 of tone range 415 is shown presented within a dot cell 905. Dot 900 has a body section 910 and at least one extension 915 extending from body section 910 toward its nearest neighbour. Preferably there are further extensions 915A, 915B and 915C that extend from the body 910 to respective nearest neighbours.

Extension 915 preferably extends from body section 910 from the midpoint of a line connecting corner 920 and 930 of the body section 910. As shown in FIG. 9, preferably each of the extensions 915 extend from the midpoint of the side of the body section 910 from which they extend.

Extensions 915 are greater in width than extensions 815 from FIG. 8. The body section 910 is approximately the same size as body section 810 and the larger of the dots 700 within the second tone range. However the increased thickness of the extensions results in smaller adjacent cross shapes or non printed areas 940, 940A, 940B and 940C. This in turn results in the fourth tone range 415 being darker than the third tone range 410.

As shown in FIG. 9, the body section 910 is substantially square and preferably has at least one and preferably four partly concave sides.

It is anticipated that the extensions 815 and 915 in some embodiments will extend to the extreme edge of the dot cell within which the dot is represented. This will have the effect of connecting the extensions to nearest neighbours.

Figure 9A:
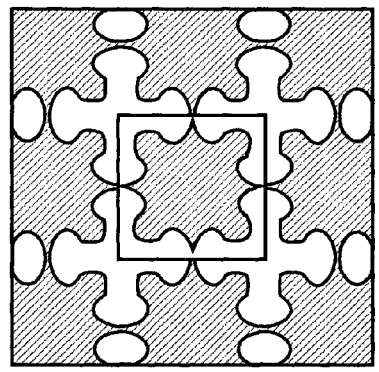
FIGS. 9A, 9B and 9C show other preferred form dots within the fourth tone range from FIG. 4.
Figure 9B:
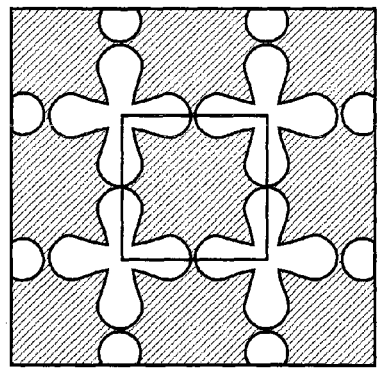
Figure 9C:
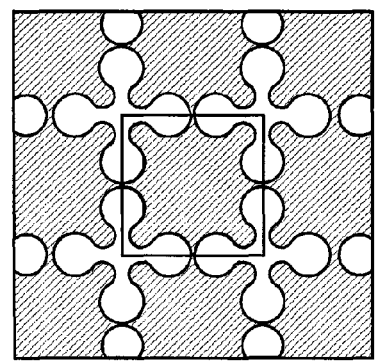

FIGS. 9A, 9B and 9C show alternative examples of preferred form dots included within the fourth tone range. The dots in these figures would typically be used where alternative dot 800B shown in FIG. 8B is also used.

Figure 10:
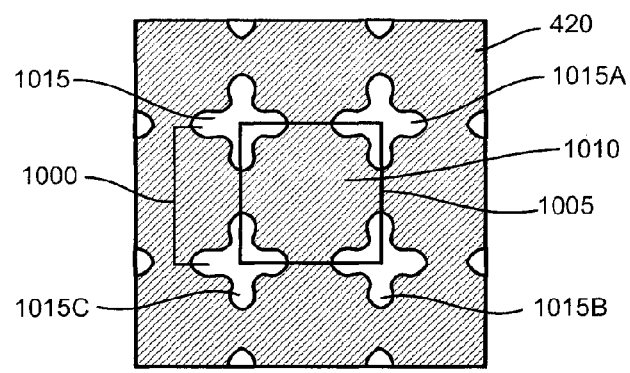
FIG. 10 shows a preferred form dot forming part of a fifth tone range from FIG. 4.

Referring to FIG. 4 and FIG. 10, preferably there is a fifth tone range 420 in which a dot 1000 shown presented within a dot cell 1005 includes a body section 1010. The cross-shaped non printed areas 1015, 1015A, 1015B and 1015C are each smaller in area than the non-printed areas in any of the first to fourth tone ranges 400, 405, 410 and 415. This effect is caused by a widening of the extensions.

Figure 11:
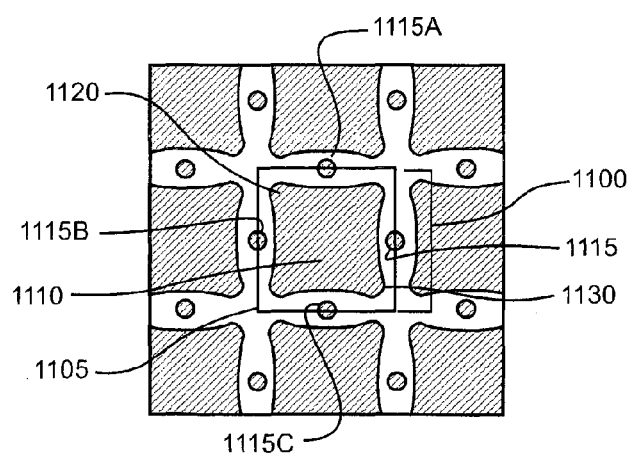
FIG. 11 shows a preferred form intermediate tone range shape preceding the dot shape of FIG. 8A.

FIG. 11 shows a preferred form intermediate tone range. This intermediate tone range preferably precedes the dot shape shown in FIG. 8A. As shown in FIG. 11, the dot 1100 is presented within the dot cell 1105. Dot 1100 has a body section 1110. Dot 1100 has at least one portion 1115 that is positioned outwardly of and separate from the body section 1110. As shown in FIG. 11 there are preferably four portions shown at 1115, 1115A, 1115B and 1115C. Where there is more than one portion 1115, each portion 1115 is positioned toward a nearest neighbour.

The portions 1115 shown in FIG. 11 are generally semicircular and are positioned adjacent the border of the dot cell 1105 so that the portions touch corresponding portions associated with nearest neighbours. However, in practice, some portions in the intermediate tone range will touch body section 1110 and/or will not touch corresponding portions associated with nearest neighbours. It is anticipated that portions 1115 could be any shape and are not required to be semicircular.

Preferably the portions 1115 are narrower in width than the body section 1110. The body section 1110 of dot 1100 is substantially the same size as the larger of the dots 700 within the second tone range. The intermediate tone range is darker than the second tone range. Furthermore, the third tone range is darker than the intermediate tone range.

The body section 1110 of dot 1100 is preferably a substantially square shape. As shown in FIG. 11, the body section 1110 preferably includes at least one and preferably four concave sides.

The portions 1115 are positioned adjacent to a midpoint of a line connecting corner 1120 and corner 1130 of the body section 1110. As shown in FIG. 11, preferably each of the portions 1115, 1115A, 1115B and 1115C are positioned adjacent to the midpoint of the side of the body 1110 closest to the portion.

The foregoing describes the invention including preferred forms thereof. Modifications and improvements as would be obvious to those skilled in the art are intended to be incorporated in the scope hereof, as defined by the accompanying claims.

The invention claimed is:

1. A method of forming a halftone screen, the method comprising:
    representing a first tone range by forming a plurality of dots arranged in a grid;
    representing a second tone range by forming a plurality of dots arranged in a grid, the dots representing the second tone range larger in size than the dots representing the first tone range, the second tone range darker than the first tone range;
    representing a third tone range by forming a plurality of dots arranged in a grid having cross-shaped non-printed areas between at least some of the dots representing the third tone range, the dots having a body section and at least one extension extending toward a respective nearest neighbour or respective nearest neighbours, the extension(s) narrower in width than the body sections of the dots, the body sections of the dots representing the third tone range substantially the same size as the larger dots within the second tone range, the third tone range darker than the second tone range;
    representing a fourth tone range by forming a plurality of dots arranged in a grid, the dots having a body section and at least one extension extending toward a respective nearest neighbour or respective nearest neighbours, the extension(s) greater in width than the extension(s) associated with the dots representing the third tone range, the fourth tone range darker than the third tone range; and
    using a printing system to print an image using at least one of the first tone range, the second tone range, the third tone range or the fourth tone range.

2. The method of claim 1 further comprising forming cross-shaped non-printed areas between at least some of the dots representing the fourth tone range, the cross-shaped non-printed areas between the dots representing the fourth tone range smaller in area than the cross-shaped non-printed areas between the dots representing the third tone range.

3. The method of claim 1 wherein the body sections of the dots representing the fourth tone range are substantially square on a parallel orientation.

4. The method of claim 3 wherein the substantially square dots representing the fourth tone range have at least partly concave sides.

5. The method of claim 3 wherein at least one extension extending from the substantially square body sections of the dots representing the fourth tone range extend(s) from a respective midpoint or respective midpoints of respective lines connecting two adjacent corners of the substantially square body sections.

6. The method of claim 1 wherein the at least one extension extending from the body sections of the dots representing the fourth tone range extend(s) from an edge of a dot at a point that is in line with a centre of the dot and a centre of a respective nearest neighbour or respective nearest neighbours.

7. The method of claim 1 wherein the dots representing the third tone range are connected to at least one nearest neighbour with the respective extensions.

8. The method of claim 1 wherein the dots representing the fourth tone range are connected to at least one nearest neighbour with the respective extensions.

9. The method of claim 1 further comprising representing a fifth tone range by forming a plurality of non-printed areas smaller in area than the non-printed areas in the third and fourth tone ranges.

10. The method of claim 1 wherein the dots representing the first tone range are substantially square on a parallel orientation.

11. The method of claim 10 wherein the substantially square dots representing the first tone range have at least partly concave sides.

12. The method of claim 1 wherein the dots representing the first tone range are substantially circular.

13. The method of claim 1 wherein the dots representing the first tone range are substantially cross-shaped.

14. The method of claim 1 wherein the dots representing the second tone range are substantially square on a parallel orientation.

15. The method of claim 14 wherein the substantially square dots representing the second tone range have at least partly concave sides.

16. The method of claim 1 wherein the body sections of the dots representing the third tone range are substantially square on a parallel orientation.

17. The method of claim 16 wherein the substantially square body sections of the dots representing the third tone range have at least partly concave sides.

18. The method of claim 16 wherein at least one extension extending from the substantially square body sections of the dots representing the third tone range extend(s) from a respective midpoint or respective midpoints of respective lines connecting two adjacent corners of the substantially square body sections.

19. The method of claim 1 wherein the at least one extension extending from the body sections of the dots representing the third tone range extend(s) from an edge of a dot at a point that is in line with a centre of the dot and a centre of a respective nearest neighbour or respective nearest neighbours.

20. The method of claim 1 wherein the width of the extensions extending from the body sections of the dots representing the third tone range at any point is inversely proportional to a distance of the point from the body sections.

21. The method of claim 1 wherein the width of the extensions extending from the body sections of the dots representing the third tone range is substantially uniform along a length of the extension.

22. The method of claim 1 wherein the width of extensions extending from the body sections of the dots representing the third tone range is non-uniform along a length of the extension.

23. The method of claim 1 further comprising:
representing an intermediate tone range by forming a plurality of dots arranged in a grid, the intermediate tone range darker than the second tone range, the third tone range darker than the intermediate tone range, the dots having a body section and one or more portions positioned outwardly of and separate from the body section.

24. A tangible non-transitory computer readable medium having stored thereon computer-executable instructions for performing a method of forming a halftone screen, the method comprising:
representing a first tone range by forming a plurality of dots arranged in a grid;
representing a second tone range by forming a plurality of dots arranged in a grid, the dots representing the second tone range larger in size than the dots representing the first tone range, the second tone range darker than the first tone range;
representing a third tone range by forming a plurality of dots arranged in a grid having cross-shaped non-printed areas between at least some of the dots representing the third tone range, the dots having a body section and at least one extension extending toward a respective nearest neighbour or respective nearest neighbours, the extension(s) narrower in width than the body sections of the dots, the body sections of the dots representing the third tone range substantially the same size as the larger dots within the second tone range, the third tone range darker than the second tone range; and
representing a fourth tone range by forming a plurality of dots arranged in a grid, the dots having a body section and at least one extension extending toward a respective nearest neighbour or respective nearest neighbours, the extension(s) greater in width than the extension(s) associated with the dots representing the third tone range, the fourth tone range darker than the third tone range.

25. The medium of claim 24 wherein the method further comprises forming cross-shaped non-printed areas between at least some of the dots representing the fourth tone range, the cross-shaped non-printed areas between the dots representing the fourth tone range smaller in area than the cross-shaped non-printed areas between the dots representing the third tone range.

26. The medium of claim 24 wherein the body sections of the dots representing the fourth tone range are substantially square on a parallel orientation.

27. The medium of claim 26 wherein the substantially square dots representing the fourth tone range have at least partly concave sides.

28. The medium of claim 26 wherein at least one extension from the substantially square body sections of the dots representing the fourth tone range extend(s) from a respective midpoint or respective midpoints of respective lines connecting two adjacent corners of the substantially square body sections.

29. The medium of claim 24 wherein the at least one extension extending from the body sections of the dots representing the fourth tone range extend(s) from an edge of a dot at a point that is in line with a centre of the dot and a centre of a respective nearest neighbour or respective nearest neighbours.

30. The medium of claim 24 wherein the dots representing the third tone range are connected to each nearest neighbour with the respective extensions.

31. The medium of claim 24 wherein the dots representing the fourth tone range are connected to each nearest neighbour with the respective extensions.

32. The medium of claim 24, wherein the method further comprises representing a fifth tone range by forming a plurality of non-printed areas smaller in area than the non-printed areas in the third and fourth tone ranges.

33. The medium of claim 24 wherein the dots representing the first tone range are substantially square on a parallel orientation.

34. The medium of claim 33 wherein the substantially square dots representing the first tone range have at least partly concave sides.

35. The medium of claim 24 wherein the dots representing the first tone range are substantially circular.

36. The medium of claim 24 wherein the dots representing the first tone range are substantially cross-shaped.

37. The medium of claim 24 wherein the dots representing the second tone range are substantially square on a parallel orientation.

38. The medium of claim 37 wherein the substantially square dots representing the second tone range have at least partly concave sides.

39. The medium of claim 24 wherein the body sections of the dots representing the third tone range are substantially square on a parallel orientation.

40. The medium of claim 39 wherein the substantially square body sections of the dots representing the third tone range have at least partly concave sides.

41. The medium of claim 39 wherein at least one extension extending from the substantially square body sections of the dots representing the third tone range extend(s) from a respective midpoint or respective midpoints of respective lines connecting two adjacent corners of the substantially square body sections.

42. The medium of claim 24 wherein the at least one extension extending from the body sections of the dots representing the third tone range extend(s) from an edge of a dot at a point that is in line with a centre of the dot and a centre of a respective nearest neighbour or respective nearest neighbours.

43. The medium of claim 24 wherein the width of the extensions extending from the body sections of the dots representing the third tone range at any point is inversely proportional to a distance of the point from the body sections.

44. The medium of claim 24 wherein the width of the extensions extending from the body sections of the dots representing the third tone range is substantially uniform along a length of the extension.

45. The medium of claim 24 wherein the width of extensions extending from the body sections of the dots representing the third tone range is non-uniform along a length of the extension.

46. The medium of claim 24 wherein the method further comprises:
representing an intermediate tone range by forming a plurality of dots arranged in a grid, the intermediate tone range darker than the second tone range, the third tone range darker than the intermediate tone range, the dots having a body section and one or more portions positioned outwardly of and separate from the body section.

47. A printing system for generating a halftone screen, the halftone screen comprising:
a first tone range comprising a plurality of dots arranged in a grid;
a second tone range comprising a plurality of dots arranged in a grid, the dots representing the second tone range larger in size than the dots representing the first tone range, the second tone range darker than the first tone range;
a third tone range comprising a plurality of dots arranged in a grid having cross-shaped non-printed areas between at least some of the dots representing the third tone range, the dots having a body section and at least one extension extending toward a respective nearest neighbour or respective nearest neighbours, the extension(s) narrower in width than the body sections of the dots, the body sections of the dots representing the third tone range substantially the same size as the larger dots representing the second tone range, the third tone range darker than the second tone range; and
a fourth tone range comprising a plurality of dots arranged in a grid, the dots having a body section and at least one extension extending toward a respective nearest neighbour or respective nearest neighbours, the extension(s) greater in width than the extension(s) associated with the dots representing the third tone range, the fourth tone range darker than the third tone range.

48. A printing system comprising:
a memory;
a processor programmed to form at least one halftone screen and store the halftone screen in the memory, the processor further programmed to:
represent a first tone range by forming a plurality of dots arranged in a grid;
represent a second tone range by forming a plurality of dots arranged in a grid, the dots representing the second tone range larger in size than the dots representing the first tone range, the second tone range darker than the first tone range;
represent a third tone range by forming a plurality of dots arranged in a grid having cross-shaped non-printed areas between at least some of the dots representing the third tone range, the dots having a body section and at least one extension extending toward a respective nearest neighbour or respective nearest neighbours, the extension(s) narrower in width than the body sections of the dots, the body sections of the dots representing the third tone range substantially the same size as the larger dots representing the second tone range, the third tone range darker than the second tone range; and
represent a fourth tone range by forming a plurality of dots arranged in a grid, the dots having a body section and at least one extension extending toward a respective nearest neighbour or respective nearest neighbours, the extension(s) greater in width than the extension(s) associated with the dots representing the third tone range, the fourth tone range darker than the third tone range.

* * * * *